July 15, 1969  W. A. BURTIS  3,455,562
DYNAMIC METAL SEAL
Filed Dec. 20, 1966  3 Sheets-Sheet 1
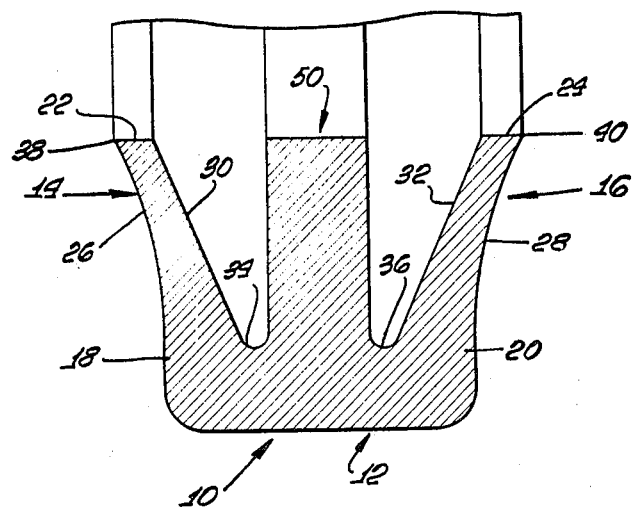
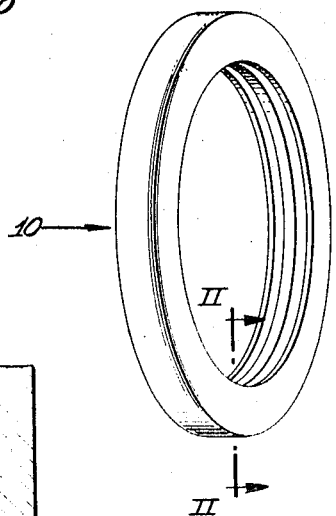
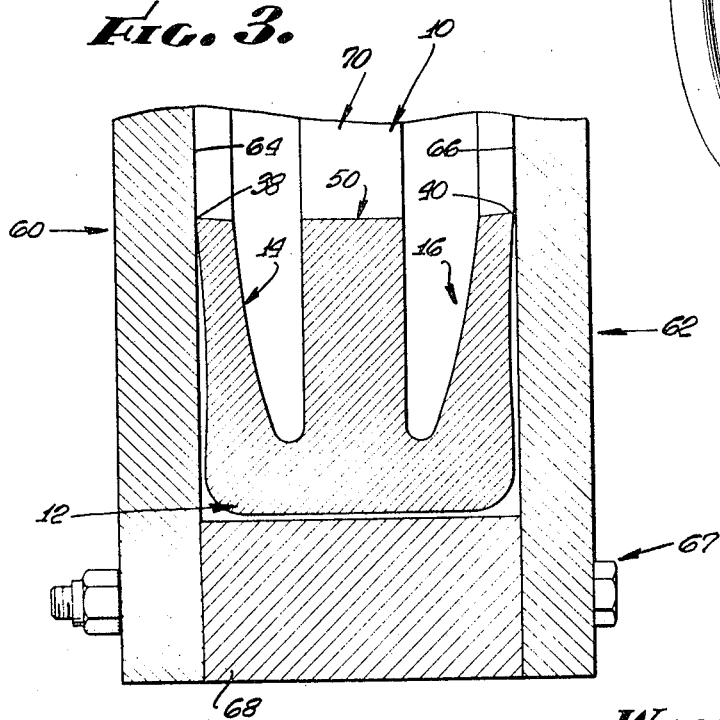
INVENTOR.
WILSON A. BURTIS
BY
Miketta, Glenny, Poms & Smith
ATTORNEYS.

July 15, 1969  W. A. BURTIS  3,455,562
DYNAMIC METAL SEAL

Filed Dec. 20, 1966  3 Sheets-Sheet 2

INVENTOR.
WILSON A. BURTIS
BY
Miketta, Glenny, Poms & Smith
ATTORNEYS.

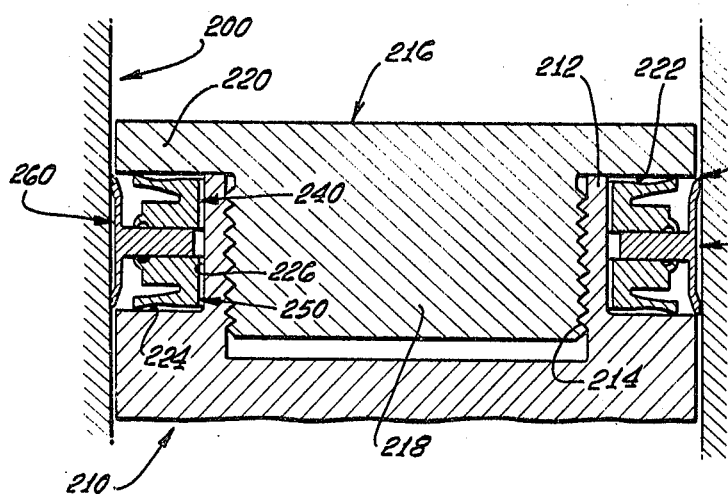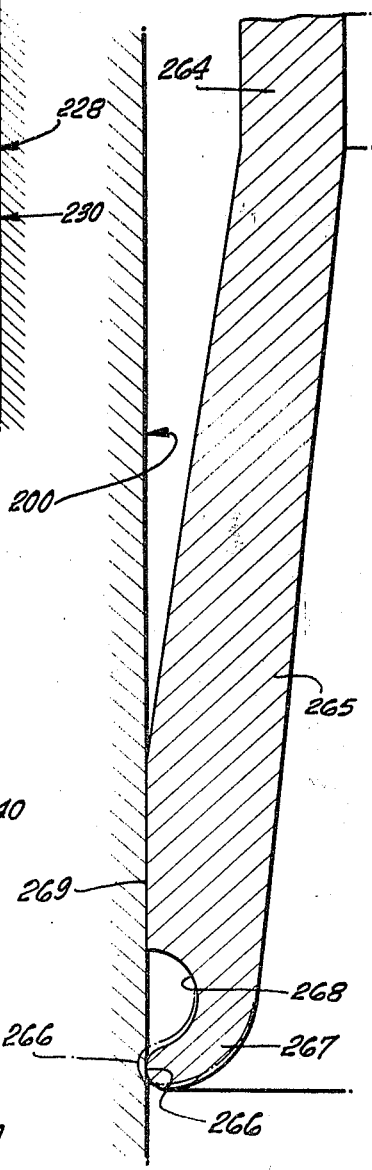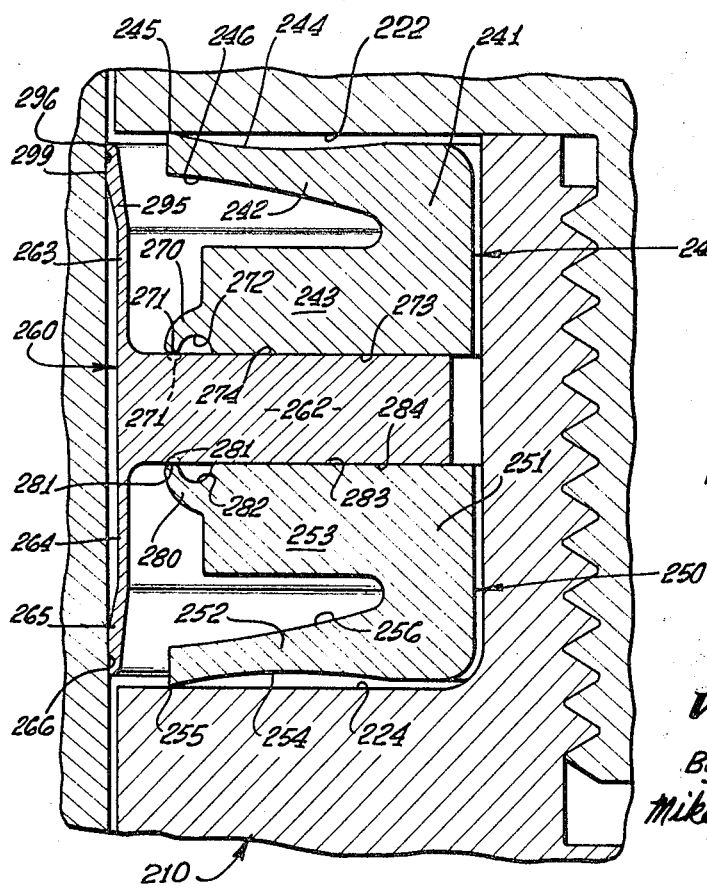

United States Patent Office 3,455,562
Patented July 15, 1969

---

3,455,562
DYNAMIC METAL SEAL
Wilson A. Burtis, Westminster, Calif., assignor to Dover Corporation, Louisville, Ky., a corporation of Delaware
Continuation-in-part of application Ser. No. 259,838, Feb. 20, 1963. This application Dec. 20, 1966, Ser. No. 603,321
Int. Cl. F16j 9/00, 1/00, 15/32
U.S. Cl. 277—58                  5 Claims

---

ABSTRACT OF THE DISCLOSURE

A seal base having arms and a central reinforcing leg extending from the base, distal edges of the arms constituting sealing edges. Cross-sectional area of arms decreases toward sealing edges so unit stress in arms tends to be uniform. Dynamic construction provides split seal base with a member sealably held between seal parts to sealingly contact a cylindrical surface such as a shaft or cylinder wall movable relative to arm sealing edges.

---

Cross-reference to related application

This application is a continuation-in-part of application Ser. No. 259,838, filed Feb. 20, 1963, now U.S. Patent No. 3,294,409, issued Dec. 27, 1966.

Summary of the invention

The seal in accordance with the present invention is adapted to meet modern requirements of preventing leakage of fluid under pressures of 5000 p.s.i.g. and higher, and cycled pressure impulses creating pressure gradients exceeding 100,000 p.s.i. per second. The construction is such as to permit appreciable relative movement of the workpieces or structural members defining the cavity in which the present device is disposed, without impairing the efficacy of its sealing function, and the seal may be reused a number of times without loss of sealing ability.

In the preferred form of the invention, hereinafter described and illustrated in detail, the seal is in the form of an annular body having a shape as seen in transverse section approximating a block letter W, with the outer arms and central leg extending generally radially inwardly toward the pressure fluid. With the seal is unstressed condition, the outer arms of the W are divergent from their roots or base portion of the seal, and the outwardly facing surfaces of the outer arms are concave, the outer edges of the distal ends of the arms constituting the sealing edges. When the seal is mounted in a suitable cavity defined by opposed hardened surfaces of workpieces, the workpiece surfaces force the seal outer arms inwardly or toward one another. Thus these arms are stressed when in sealing position, and the concavity of their outer surfaces, together with the fact that their inner surfaces are essentially flat, provides a cross-sectional area decreasing from root to tip. As a result, the unit stress is virtually uniform throughout the arms, so that the strength of the metal is most effectively used for a seal of given weight. The geometry of the cavity is such that the stress remains below the elastic limit of the material, and accordingly no permanent deformation or set takes place. Thus, the seal is reusable and is essentially self-energized when in sealing position. The force of fluid pressure within the cavity exerted against the arm inner walls decreases the effective stress in the arms. The seal is accordingly useful over very wide ranges of temperature and fluid pressure.

The central portion or leg of the letter W provides, with minimum added weight, substantially greater radial stiffness and reduces hoop stress in the seal, which if not reduced would tend to rotate the arms away from their sealing contact with the workpiece faces, permit seal movement and resultant galling of the faces and reduce the effective life of the seal.

The seal may be effectively split along the center of the letter W to form a pair of seal parts each having an arm and a leg extending from a seal part base, with a third seal part including a flange or annular rib movably and sealably disposed between the seal part legs. The third seal part is provided with annular skirt means terminating in sealing edges for movably and sealably contacting a cylindrical surface.

Accordingly it is a principal object of the present invention to provide a novel metal-to-metal seal. Other objects are to provide such a device in annular form wherein the sealing edge is at the distal end of a continuous annular lip constituting an arm as seen in section, the metal of the arm being stressed substantially uniformly throughout its length when the seal is in sealing relation with a workpiece; to provide such a device wherein fluid pressure creates a force decreasing the effective stress in such lip; to provide such a device wherein the line contact sealing edge or edges undergo virtually no movement relative to faces of workpieces against which they bear, regardless of variations in fluid pressure; and for other and additional objects and purposes as will become clear from a reading of the following description of exemplary embodiments thereof taken in connection with the accompanying drawings in which:

FIG. 1 is a perspective view of an annular seal in accordance with a preferred embodiment of the invention.

FIG. 2 is a transverse sectional view on an enlarged scale taken on line II—II of FIG. 1, the seal being unstressed.

FIG. 3 is a sectional view of the device of FIG. 2 mounted in a cavity fragmentarily shown, the seal being in a sealing relation with faces of structural members defining the cavity.

FIG. 6 is a fragmentary sectional view of a piston slidably mounted in a cylinder, showing another form of the dynamic seal.

FIG. 7 is a fragmentary sectional view, on an enlarged scale, of a portion of the seal of FIG. 6, with the dynamic sealing edges shown in dotted outline in unstressed condition.

FIG. 8 is a fragmentary sectional view on an even further enlarged scale, showing details of one of the dynamic sealing edges of the seal of FIGS. 6 and 7, the edge in unstressed condition being shown in dotted outline.

Figure 4:
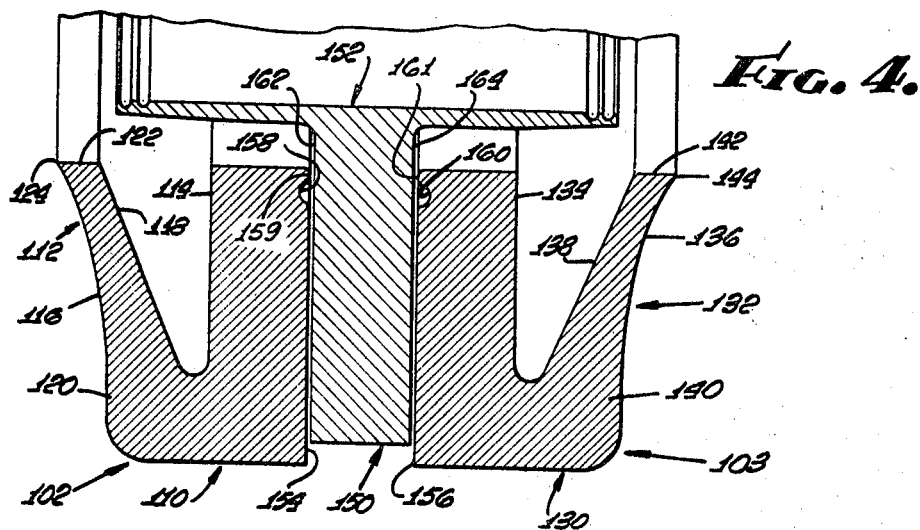
FIG. 4 is a transverse sectional view corresponding to FIG. 2 but showing an alternative form of the invention adapted to be used as a dynamic seal.

Referring now in detail to the drawings, there is shown in FIG. 1 a preferred embodiment of the seal in accordance with the present invention. As there appears, the seal is generally annular, and its shape as seen in transverse section, as shown in FIG. 2, resembles a block letter W. Thus the seal indicated generally at 10 includes a base portion indicated generally at 12 and a pair of laterally spaced preferably symmetrical arms indicated respectively at 14 and 16 extending generally radially inwardly from the base 12 and formed integrally therewith. It will be understood that the arms are in fact continuous annular lips, but are referred to herein as arms because of their appearance seen in section. The arms diverge from one another in their extent from their root portions 18 and 20 respectively at base 12 to their distal ends 22 and 24 respectively. The outwardly facing surfaces 26 and 28 respectively of the arms are formed to be concave, while the inwardly facing surfaces 30 and 32 respectively of the arms are flat as seen in section, being actually substantially frusto-conical. These inwardly facing surfaces join the base 12 in curved juncture portions 34 and 36 respectively at the roots of the arms.

The axially outermost tips 38 and 40 respectively of the arms are by preference rounded as by a very small radius, of the order of 0.001 inch or less, forming a line contact for the sealing edges when the seal is mounted in sealing relation between the faces of two metallic structural members or workpieces.

The concave outwardly facing surfaces 26 and 28 of the arms are preferably formed by radii from points in general alignment with or slightly below the roots of the arms, the radii having values somewhat greater than the length of the arms from root to distal end, preferably of the order of from two to three times such arm length. As a result, and keeping in mind the frusto-conical shape of the inwardly facing surfaces of the arms, the cross-sectional area of each arm decreases from the root to the distal end, so that the unit stress is substantially uniform throughout the length of the arm when the seal is in operative sealing position in a cavity as will be described in connection with FIG. 3.

Intermediate the two arms 14 and 16, and projecting radially inwardly from the base 12 there may be provided an annular rib or strut, seen in the sectional view of FIG. 2 as a central leg indicated generally at 50. Depending upon design considerations and the magnitude of pressure to be sealed by the present device, the inward extent of the central leg 50 may be generally similar to the length of each of the arms 14 and 16.

In FIG. 3 the seal of the present invention is shown in operative sealing position between hardened faces of spaced workpieces. Thus in FIG. 3 two workpieces indicated generally at 60 and 62 have hardened inner faces 64 and 66 respectively, the two workpieces being held in assembled relation by suitable fastening means indicated generally at 67 passing through a spacer member 68 between the workpieces. The seal 10 is disposed within the cavity formed by the workpieces and spacer, base 12 being desirably spaced from the spacer, and it will be noted that the distance between the inner faces 64 and 66 of the workpieces when in assembled relation is substantially less than the distance between the sealing edges or tips 38 and 40 when the seal is in unstressed condition as seen in FIG. 2. It will thus be understood that the arms are forced inwardly toward one another by the workpieces whose inner faces define the axial extent of the cavity indicated generally at 70. The stress thus imposed upon the arms is made to be somewhat less than the elastic limit of the metal used for the seal, and, as previously pointed out, the shape of the arms is such that the stress is substantially uniform throughout the length of the arms from their roots to their distal ends.

It is to be particularly noted that the force of fluid under pressure in cavity 70 is exerted outwardly against the side walls 30 and 32 constituting the inwardly directed surfaces of arms 14 and 16 respectively. Since the metal in those arms, aside from the effect of pressure fluid, is prestressed up to a value not far below the elastic limit of the material throughout the lengths of the arms by reason of bearing against faces 64 and 66 as previously described, it will be seen that fluid pressure exerted against the arm inner surfaces 30 and 32 as above described tends to decrease the stress within the arms created by their being deformed within the cavity. At the same time, the outwardly exerted force of pressure fluid in the cavity against the arms serves to augment the outward bearing pressure along the line contacts 38 and 40 constituting the sealing edges of the present device.

The combination of forces as above described results in virtually zero movement of the sealing edges relative to the faces 64 and 66 of the workpieces over extreme pressure variations, so that galling of such faces is virtually completely eliminated.

Flexibility of adaptation for various uses and applications of the principles of the present seal may be enhanced by effectively splitting the W centrally thereof into a pair of symmetrically formed seal parts and receiving between the two seal parts the flange or annular rib of a third seal part provided with means for movably sealing with a cylindrical surface. Such an arrangement is shown in FIGS. 4 and 5 wherein the embodiment of the invention there shown is applied to sealing in connection with the cylindrical surface of a movable shaft journaled for axial or rotational movement in a flanged bearing member forming the third seal part, and the construction further incorporates self-aligning or adjustability features of such shaft relative to the pair of symmetrical seal parts.

Figure 5:
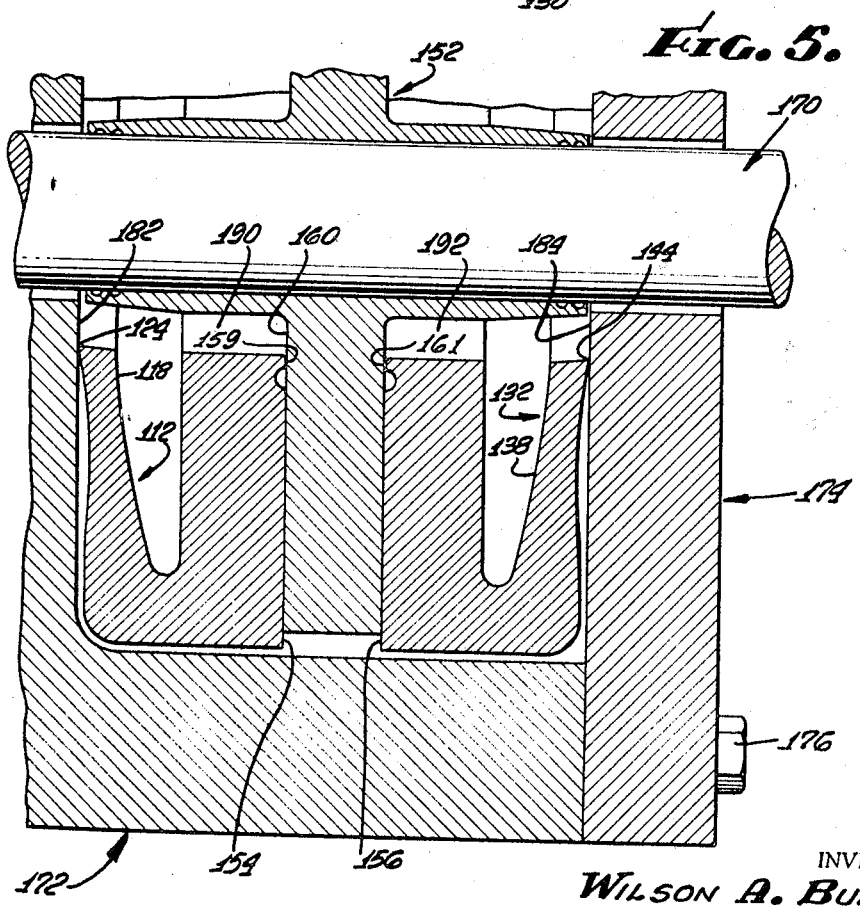
FIG. 5 is a sectional view of the form of the invention shown in FIG. 4 mounted in a cavity fragmentarily shown, together with a shaft sealably journaled in one of the seal parts.

In FIG. 4, the seal comprises two seal parts, left and right seal parts indicated generally at 102 and 103 respectively. It will be understood that FIG. 4 is a transverse sectional view corresponding generally to FIG. 2 and showing the parts in unstressed condition. Seal part 102 includes a base portion indicated generally at 110 and integrally formed therewith and extending generally radially inwardly therefrom, an arm indicated generally at 112 and a leg 114. Arm 112 is formed similarly to arm 14 previously described in connection with FIG. 2, including a concave outwardly directed surface 116 and an inwardly directed surface 118 which is essentially frusto-conical in shape, thereby affording the characteristic tapering cross-sectional area from the root portion 120 adjacent base 110 to the distal end 122 of the arm, as discussed in connection with FIG. 2. The axially outermost edge 124 of arm 112 may be slightly rounded as by a radius of 0.001 inch or less, constituting the line contact sealing edge of the arm when it is in sealing position.

Seal part 103 is symmetrically disposed relative to seal part 102 and includes a base portion indicated generally at 130, an integral formed arm indicated generally at 132 and a leg 134, the arm being defined outwardly by a concave outer wall 136 and inwardly by a frusto-conical wall 138, so that the cross-sectional area of the arm tapers from a maximum at the root 140 to a minimum at the distal end of the arm 142. The axially outermost edge 144 of the arm is slightly rounded in the same manner as edge 124 just mentioned.

Between seal part 102 and 103 the seal of FIG. 4 includes a flanged member, comprising a flange or annular rib indicated generally at 150 extending radially outwardly from and desirably formed integrally with an axially extending bearing-like portion indicated generally at 152. The otherwise flat inwardly directed surfaces 154 and 156 of legs 114 and 134 respectively may include relief grooves 158 and 160 adjacent the distal ends of the legs and defining sealing edges 159 and 160 therebeyond sealingly contactable with the flat side walls 162 and 164 of the flange 150 when the seal is assembled, as will be understood in connection with FIG. 5. Sealing edges 159 and 161 may desirably be rounded on a radius substantially greater than that of edges 124 and 144, for example, on a radius of 0.020 inch or more as contrasted to the suggested radius of 0.001 inch for edges 124 and 144.

In FIG. 5 the seal construction of FIG. 4 is shown mounted in a suitable cavity formed by metallic structural members or workpieces, with a shaft indicated generally at 170 movably and sealably journaled in bearing 152. It will be seen that the bearing portion 152 constitutes effectively a portion of the seal preventing fluid movement axially of the shaft sealably journaled therein, although it does not function as a bearing in the sense of supporting the weight of the shaft. Thus, structural members indicated generally at 172 and 174 may be retained in assembled relation as shown by suitable means 176, the structural members being provided with bores 178 and 180 respectively formed therein, through which shaft 170 extends. The structural members 172 and 174 include inwardly directed flat hardened faces 182 and 184 respectively. With the parts in assembled relation as seen in FIG. 5, the arms 112 and 132 of the seal part 102 and 103 respectively are prestressed by reason of the geometry of the cavity, so that the sealing edges 124 and 144 are forced outwardly by such stress into sealing line contact with the faces 182 and 184. As in the case of the embodiment of the invention first shown and described in connection with FIGS. 1–3, pressure fluid within the cavities 190 and 192 exerts a force against the respective arm walls 118 and 138, and the stress in the arm resulting from such force acts oppositely to the stress created by the initial deformation of the arm, thus decreasing the effective stress in the same manner as previously described in connection with FIGS. 2 and 3. Groove 158 effectively diminishes the cross-sectional area of leg 114 and thereby tends to insure that sealing edge 159 is forced into its sealing contact flange wall 162 with high unit bearing stress by pressure fluid in cavity 190. Groove 160 serves a similar purpose for sealing edge 161.

A certain amount of radial movement of flange or annular rib 150 can take place relative to seal parts 110 and 130 by reason of the virtual planarity of flange side walls 162, 164 and of seal part side walls 154, 156, and of the resulting small unit bearing loading therebetween. Because of this fact and the effective sealing afforded by the fit of the shaft in bearing 152, the construction of FIG. 5 constitutes a dynamic shaft seal and permits, within a reasonably wide range, alignment of the bearing axis relative to the seal.

In FIGS. 6, 7 and 8 the seal in accordance with the present invention is shown as used on a piston in slidable engagement within a cylinder. Thus, a cylinder is provided with an inner cylindrical wall indicated generally at 200, and a piston indicated generally at 210 is mounted for longitudinal movement therein, in conventional maner.

Piston 210 includes an upwardly extending neck 212 of reduced diameter having an internally threaded axial bore 214 formed therein. A seal retaining member indicated generally at 216 includes a downwardly extending shank 218 threadedly received in the bore 214. In its upper portion, retainer 216 is provided with a cylindrical flange 220 having an outside diameter approximately equal to that of piston 210 and slightly smaller than the inside diameter of cylinder 200. The outer annular portion of flange 220 provides a downwardly directed annular shoulder 222 which bottoms on neck 212 and, in conjunction with annular shoulder 224 of piston 210 and the outer cylindrical wall 226 of piston neck 212, defines a cavity indicated generally at 228 for receiving a seal indicated generally at 30, to be now described.

With particular reference to FIG. 7, the seal as there shown includes an upper seal part indicated generally at 240, a lower seal part indicated generally at 250 and disposed symmetrically relative to seal part 240, and a seal part indicated generally at 260, provided with an annular rib 262 between the two parts 240 and 250. Seal part 240 includes an axially extending base 241 and, extending radially outwardly therefrom in spaced relation from one another, an arm 242 and a leg 243. Arm 242 has an upwardly directed concave face 244 terminating at the distal end of the arm in a sealing edge 245 in sealing contact with shoulder 222. The lower wall 246 of arm 242 is desirably substantially frusto-conical when unstressed, although when mounted in a sealing cavity as shown in FIG. 7 the inner wall 246 may be very slightly concave as shown. Desirably leg 243 extends radially outwardly from base 241 approximately the same distance as the arm 242, including an outer finger portion 270 of reduced section terminating in a sealing edge 271 outwardly of groove 272. Sealing edge 271 is desirably curvilinear in contour, being rounded on a radius of 0.020 inch or more, and may also be formed so that, in unstressed condition, as indicated in dotted outline, the edge 271 projects slightly beyond the plane of annular face 273 of leg 243, to insure initial sealing contact against annular face 274 of rib 262.

Seal part 250, as previously mentioned, is formed and disposed symmetrically relative to seal part 240 just described. Thus, seal part 250 includes an axially extending annular base 251, a sealing arm 252 and a leg 253 both extending radially outwardly from the base 251 in spaced relation. Arm 252 is provided with a downwardly directed generally concave face 254, terminating distally in a sealing edge 255, bearing against annular shoulder 224 of the piston. The other face 256 of arm 252 may be slightly concave as shown when in stressed condition.

Leg 253 extends radially outwardly from base 251 approximately the same distance as arm 252, including an outer finger portion 280 of reduced section terminating in a sealing edge 281 outwardly of groove 282. Sealing edge 281 is desirably curvilinear in contour, being rounded on a radius of 0.020 inch or more, and may also be formed so that, in unstressed condition as indicated in dotted outline, the edge 281 projects slightly beyond the plane of annular face 283 of leg 253, to insure initial sealing contact against annular face 284 of rib 262.

Seal part 260 includes, outwardly of rib 262 and formed integrally therewith, annular skirt portions 263 and 264 extending upwardly and downwardly respectively from the rib as seen in FIG. 7. Skirts 263 and 264 are configured and disposed symmetrically, and are desirably made of metal of fairly thin cross section in order to permit some degree of flexure and thereby provide sealing contact with the inner wall of cylinder 200.

The details of the sealing contact of the seal of FIGS. 6 and 7 with cylindrical wall 200 will be best understood by reference to the further enlarged showing of FIG. 8. As there appears, downwardly extending skirt 264 of seal part 260 is outwardly flared at 265 and terminates downwardly in sealing edge 266 at the distal end of a curved finger portion 267 formed by groove 268. Upwardly of groove 268 the skirt includes a cylindrical seat 269 bearing against cylinder wall 200. As indicated in dotted outline, finger 267 in its unstressed condition may be formed so that sealing edge 266 is slightly outwardly of the cylindrical seat 269, to insure initial sealing contact with wall 200. Edge 266 may be rounded as shown on a radius of 0.020 inch or more, substantially greater than the suggested radius of 0.001 inch or thereabouts suggested for sealing edges 245 and 255, which are essentially static in the present seal.

Upwardly extending skirt 263 is configured and disposed symmetrically to skirt 264 about rib 262, and includes an outwardly flared portion 295 terminating in sealing edge 296 upwardly of cylindrical seat 299.

It is to be noted that the unstressed positions of sealing edges 271 and 281 in FIG. 7, and of sealing edge 266 in FIG. 8, have been exaggerated in their dotted outline showings. In practice, depending upon the fluid pressures involved, such unstressed positions will not project beyond their stressed positions, when assembled, by more than a few thousandths of an inch, at most about 0.005 inch in a typical installation. It is important that the seal material not be deformed beyond its elastic limit in operation, to avoid creating a permanent set therein. As shown in FIG. 7, the annular skirt portions 263 and 264 extend upwardly and downwardly from rib 262 by a substantial distance, desirably appreciably greater than the thickness of rib 262 itself. Since pressure fluid tends to bias the skirt portions toward the cylindrical wall 200, the annular seats or flats 269 and 299 are maintained in close movable contact with the cylindrical wall.

The reduced section of the seal material adjacent the dynamic sealing edges themselves insures that the force of pressure fluid being sealed is manifested in increased bearing force maintaining the edges in their sealing relation as above described. The comparatively large radii of curvature of the dynamic sealing edges minimize the possibility of galling or scoring during operation.

It is to be noted that the symmetrically disposed static seal parts are spaced from their respective housing cavities except for static sealing edge contact as described herein.

Modifications and changes from the illustrative forms of the invention not substantially departing therefrom are intended to be embraced within the scope of the following claims.

I claim:

1. A dynamic metal seal for sealing between two spaced opposed faces of structural members defining the longitudinal extent of an annular cavity and an object having a cylindrical wall movable relative to said members, comprising:

a pair of axially spaced, symmetrically formed and disposed annular seal parts, each being generally U-shaped as seen in section and including an axially extending seal base and a sealing arm and leg extending generally radially from the base, said arms when unstressed being axially outwardly divergent, the distal ends of the arms being formed to provide axially outwardly directed sealing edges in continuous line sealing contact with opposed structural member faces, the legs including generally planar, axially inwardly directed faces lying in spaced planes normal to the seal axis, and a third seal part provided with an annular skirt movably sealing with said cylindrical wall, and including an annular rib constituting a flange extending between said legs and having spaced parallel planar faces in abutting contact with said leg faces when the seal parts are in assembled relation with said arms stressed toward one another by the said line contact of their sealing edges with structural member faces.

2. The invention as stated in claim 1 wherein said skirt is provided distally with a pair of annular sealing edges axially symmetrically disposed about said rib for movably sealing with said wall and with grooves immediately axially inwardly of the sealing edges and with annular flats immediately axially inwardly of said grooves in slidable contact with said wall.

3. The invention as stated in claim 2 wherein the skirt is radially spaced from said wall except for the flats and sealing edges thereof.

4. The invention as stated in claim 3 wherein the distal portion of each of said legs includes a sealing edge which, when the seal is in unstressed condition, projects axially slightly beyond the general plane of the leg face, and is forced into said plane when the seal parts are in assembled relation within said cavity.

5. The invention as stated in claim 1 wherein the distal portion of each of said legs includes a sealing edge which, when the seal is in unstressed condition, projects axially slightly beyond the general plane of the leg face, and is forced into said plane when the seal parts are in assembled relation within said cavity.

References Cited

UNITED STATES PATENTS

| 2,831,713 | 4/1958 | Smith | 277—92 X |
| 2,935,365 | 5/1960 | Dega | 277—165 |
| 3,176,723 | 4/1965 | Hodgeman et al. | 277—236 |

FOREIGN PATENTS

| 1,087,853 | 8/1960 | Germany. |

LAVERNE D. GEIGER, Primary Examiner

JEFFREY S. MEDNICK, Assistant Examiner

U.S. Cl. X.R.

277—178, 180, 206, 225, 236